US011194754B2

(12) United States Patent
Thomas

(10) Patent No.: US 11,194,754 B2
(45) Date of Patent: *Dec. 7, 2021

(54) PCI EXPRESS TO PCI EXPRESS BASED LOW LATENCY INTERCONNECT SCHEME FOR CLUSTERING SYSTEMS

(71) Applicant: Mammen Thomas, Hercules, CA (US)

(72) Inventor: Mammen Thomas, Hercules, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,800

(22) Filed: Jun. 7, 2016

(65) Prior Publication Data

US 2016/0378708 A1    Dec. 29, 2016

Related U.S. Application Data

(63) Continuation of application No. 14/588,937, filed on Jan. 3, 2015, now Pat. No. 9,519,608, which is a continuation of application No. 13/441,883, filed on Apr. 8, 2012, which is a continuation of application No. 11/242,463, filed on Oct. 4, 2005, now Pat. No. 8,189,603.

(51) Int. Cl.
*G06F 13/42* (2006.01)
*H04L 12/931* (2013.01)
*G06F 13/40* (2006.01)

(52) U.S. Cl.
CPC ...... *G06F 13/4282* (2013.01); *G06F 13/4022* (2013.01); *G06F 13/4221* (2013.01); *H04L 49/40* (2013.01); *G06F 2213/0026* (2013.01)

(58) Field of Classification Search
CPC ............ G06F 13/4282; G06F 13/4022; G06F 13/4221; G06F 2213/0026; H04L 49/40
See application file for complete search history.

(56) References Cited

U.S. PATENT DOCUMENTS

| | | | |
|---|---|---|---|
| 5,805,597 A | 9/1998 | Edam | |
| 6,108,739 A | 8/2000 | James et al. | |
| 6,362,908 B1 | 3/2002 | Kimbrough et al. | |
| 6,393,548 B1 * | 5/2002 | Kerstein | H04L 12/4641 710/10 |
| 6,615,306 B1 | 9/2003 | Ajnovic | |
| 7,000,037 B2 | 2/2006 | Rabinovitz et al. | |
| 7,062,581 B2 | 6/2006 | Brocco et al. | |
| 7,145,866 B1 | 12/2006 | Ting et al. | |
| 7,457,322 B1 | 11/2008 | Flood et al. | |

(Continued)

*Primary Examiner* — Gregory B Sefcheck
*Assistant Examiner* — Joshua Smith

(57) ABSTRACT

PCI Express is a Bus or I/O interconnect standard for use inside the computer or embedded system enabling faster data transfers to and from peripheral devices. The standard is still evolving but has achieved a degree of stability such that other applications can be implemented using PCIE as basis. A PCIE based interconnect scheme to enable switching and inter-connection between multiple PCIE enabled systems each having its own PCIE root complex, such that the scalability of PCIE architecture can be applied to enable data transport between connected systems to form a cluster of systems, is proposed. These connected systems can be any computing, control, storage or embedded system. The scalability of the interconnect will allow the cluster to grow the bandwidth between the systems as they become necessary without changing to a different connection architecture.

8 Claims, 2 Drawing Sheets

(56) References Cited

U.S. PATENT DOCUMENTS

| | | | |
|---|---|---|---|
| 8,189,603 B2* | 5/2012 | Thomas | H04L 49/40 370/401 |
| 8,291,145 B2 | 10/2012 | Riley | |
| 9,519,608 B2* | 12/2016 | Thomas | H04L 49/40 |
| 2002/0111753 A1 | 8/2002 | Moch | |
| 2003/0099247 A1 | 5/2003 | Toutant et al. | |
| 2003/0123461 A1 | 7/2003 | Riley | |
| 2003/0158940 A1 | 8/2003 | Leigh | |
| 2003/0188079 A1 | 10/2003 | Singhal et al. | |
| 2004/0039986 A1 | 2/2004 | Solomon | |
| 2004/0083323 A1 | 4/2004 | Rabinovitz et al. | |
| 2004/0083325 A1 | 4/2004 | Rabinoviz et al. | |
| 2004/0179534 A1* | 9/2004 | Pettey | H04L 49/351 370/395.5 |
| 2004/0268015 A1 | 12/2004 | Petty et al. | |
| 2005/0053060 A1 | 3/2005 | Petty et al. | |
| 2005/0102454 A1 | 5/2005 | McAfee et al. | |
| 2005/0125590 A1 | 6/2005 | Li et al. | |
| 2005/0147119 A1 | 7/2005 | Tofano | |
| 2005/0215085 A1 | 9/2005 | Mehta et al. | |
| 2005/0238035 A1* | 10/2005 | Riley | H04L 45/22 370/401 |
| 2005/0240713 A1 | 10/2005 | Wu et al. | |
| 2005/0246460 A1 | 11/2005 | Stufflebeam | |
| 2005/0270988 A1 | 12/2005 | DeHaemer | |
| 2006/0004837 A1* | 1/2006 | Genovker | H04L 45/28 |
| 2006/0015537 A1 | 1/2006 | Marks | |
| 2006/0050693 A1 | 3/2006 | Bury et al. | |
| 2006/0050707 A1 | 3/2006 | Sterin | |
| 2006/0050722 A1 | 3/2006 | Bury et al. | |
| 2006/0083257 A1 | 4/2006 | Price et al. | |
| 2006/0101179 A1 | 5/2006 | Lee et al. | |
| 2006/0101185 A1 | 5/2006 | Kapoor et al. | |
| 2006/0106955 A1 | 5/2006 | Wang et al. | |
| 2006/0114918 A1* | 6/2006 | Ikeda | H04L 45/02 370/408 |
| 2006/0126612 A1 | 6/2006 | Sandy et al. | |
| 2006/0143311 A1 | 8/2006 | Madukkarumukumana et al. | |
| 2006/0206655 A1 | 9/2006 | Chappell et al. | |
| 2006/0209863 A1 | 9/2006 | Arndt et al. | |
| 2006/0212731 A1 | 9/2006 | Han et al. | |
| 2006/0227768 A1 | 10/2006 | Sauber et al. | |
| 2006/0242333 A1 | 10/2006 | Johnsen et al. | |
| 2006/0251096 A1 | 11/2006 | Metsker | |
| 2006/0259656 A1 | 11/2006 | Sullivan | |
| 2007/0019637 A1 | 1/2007 | Boyd et al. | |
| 2007/0019677 A1 | 1/2007 | Wang et al. | |
| 2007/0047536 A1 | 3/2007 | Scherer et al. | |
| 2007/0073959 A1 | 3/2007 | McAfee et al. | |
| 2007/0198763 A1 | 8/2007 | Suzuki et al. | |
| 2007/0204095 A1 | 8/2007 | Sandy et al. | |
| 2008/0034147 A1 | 2/2008 | Stubbs et al. | |
| 2008/0052431 A1 | 2/2008 | Freking et al. | |
| 2008/0147959 A1 | 6/2008 | Freimuth et al. | |
| 2008/0209099 A1 | 8/2008 | Kloppener et al. | |
| 2009/0049222 A1 | 2/2009 | Lee et al. | |
| 2010/0125653 A1 | 5/2010 | Cherian et al. | |
| 2011/0010481 A1 | 1/2011 | Hamadani et al. | |
| 2011/0153906 A1 | 6/2011 | Suzuki et al. | |
| 2011/0202701 A1 | 8/2011 | Maitra | |
| 2011/0246686 A1 | 9/2011 | Cavanagh et al. | |
| 2013/0103881 A1 | 4/2013 | Hamadani et al. | |
| 2013/0254487 A1 | 9/2013 | Tanaka et al. | |
| 2014/0173167 A1 | 6/2014 | Choi | |

* cited by examiner

Interconnected Multi-System
Cluster**
(with 8 interconnected systems)

A Cluster enlargement using switch to switch interconnect

PCI EXPRESS TO PCI EXPRESS BASED LOW LATENCY INTERCONNECT SCHEME FOR CLUSTERING SYSTEMS

CROSS REFERENCE TO RELATED APPLICATIONS

This application is a continuation of U.S. patent application Ser. No. 14/588,937 titled "PCI Express to PCI Express based low latency interconnect scheme for clustering systems" filed on Jan. 3, 2015 which is a continuation of U.S. patent application Ser. No. 13/441,883 titled "PCI Express to PCI Express based low latency interconnect scheme for clustering systems" filed on Apr. 8, 2012, which is a continuation of U.S. patent application Ser. No. 11/242,463 titled "PCI Express to PCI Express based low latency interconnect scheme for clustering systems" filed on Oct. 4, 2005 which issued as U.S. Pat. No. 8,189,603 on May 29, 2012, all of which have a common inventor, and are hereby incorporated by reference for all that they contain.

TECHNICAL FIELD

The invention generally relates to providing high speed interconnect between systems within an interconnected cluster of systems.

BACKGROUND AND PRIOR ART

The need for high speed and low latency cluster interconnect scheme for data and information transport between systems have been recognized as a limiting factor to achieving high speed operation in clustered systems and one needing immediate attention to resolve. The growth of interconnected and distributed processing schemes have made it essential that high speed interconnect schemes be defined and established to provide the speeds necessary to take advantage of the high speeds being achieved by data processing systems and enable faster data sharing between interconnected systems.

There are today interconnect schemes that allow data transfer at high speeds, the most common and fast interconnect scheme existing today is the Ethernet connection allowing transport speeds from 10 MB to as high as 10 GB/sec. TCP/IP protocols used with Ethernet have high over-head with inherent latency that make it unsuitable for some distributed applications. Further TCP/IP protocol tends to drop data packets under high traffic congestion times, which require resend of the lost packets which cause delays in data transfer and is not acceptable for high reliability system operation. Recent developments in optical transport also provide high speed interconnect capability. Efforts are under way in different areas of data transport to reduce the latency of the interconnect as this is a limitation on growth of the distributed computing, control and storage systems. All these require either changes in transmission protocols, re-encapsulation of data or modulation of data into alternate forms with associated delays increase in latencies and associated costs.

DESCRIPTION

What is Proposed

PCI Express (PCIE) has achieved a prominent place as the I/O interconnect standard for use inside computers, processing system and embedded systems that allow serial high speed data transfer to and from peripheral devices. The typical PCIE provides 2.5-3.8 GB transfer rate per link (this may change as the standard and data rates change). The PCIE standard is evolving fast, becoming faster and starting become firm and used within more and more systems. Typically each PCIE based system has a root complex which controls all connections and data transfers to and from connected peripheral devices through PCIE peripheral end points or peripheral modules. What is disclosed is the use of PCIE standard based peripherals enabled for interconnection to similar PCIE standard based peripheral connected directly using data links, as an interconnect between multiple systems, typically through one or more network switches. This interconnect scheme by using PCIE based protocols for data transfer over direct physical connection links between the PCIE based peripheral devices, (see FIG. 1), without any intermediate conversion of the transmitted data stream to other data transmission protocols or encapsulation of the transmitted data stream within other data transmission protocols, thereby reducing the latencies of communication between the connected PCI based systems within the cluster. The PCIE standard based peripheral enabled for interconnection at a peripheral end point of the system, by directly connecting using PCIE standard based peripheral to PCIE standard based peripheral direct data link connections to the switch, provides for increase in the number of links per connection as bandwidth needs of system interconnections increase and thereby allow scaling of the band width available within any single interconnect or the system of interconnects as required.

Some Advantages of the Proposed Connection Scheme:

1. Reduced Latency of Data transfer as conversion from PCIE to other protocols like Ethernet are avoided during transfer.

2. The number of links per connection can scale from X1 to larger numbers X32 or even X64 as PCIE capabilities increase to cater to the connection bandwidth needed. Minimum change in interconnect architecture is needed with increased bandwidth, enabling easy scaling with need.

3. Any speed increase in the link connection due to technology advance is directly applicable to the interconnection scheme.

4. Standardization of the PCIE based peripheral will make components easily available from multiple vendors, making the implementation of interconnect scheme easier and cheaper.

5. The PCIE based peripheral to PCIE based peripheral links in connections allow ease of software control and provide reliable bandwidth.

EXPLANATION OF NUMBERING AND LETTERING IN FIG. 1

(1) to (8): Number of Systems interconnected in FIG. 1 (9): Switch sub-system. (10): Software configuration and control input for the switch. (1a) to (8a): PCI Express based peripheral module (PCIE Modules) attached to systems. (1b) to (8b): PCI Express based peripheral modules (PCIE Modules) at switch. (1L) to (8L): PCIE based peripheral module to PCIE based peripheral module connections having n-links (n-data links)

EXPLANATION OF NUMBERING AND LETTERING IN FIG. 2

(12-1) and (12-2): clusters (9-1) and (9-2): interconnect modules or switch sub-systems. (10-1) and (10-2): Software configuration inputs (11-1) and (11-2): Switch to switch interconnect module in the cluster (11L): Switch to switch interconnection

DESCRIPTION OF INVENTION

PCI Express is a Bus or I/O interconnect standard for use inside the computer or embedded system enabling faster data transfers to and from peripheral devices. The standard is still evolving but has achieved a degree of stability such that other applications can be implemented using PCIE as basis. A PCIE based interconnect scheme to enable switching and inter-connection between multiple PCIE enabled systems each having its own PCIE root complex, such that the scalability of PCIE architecture can be applied to enable data transport between connected systems to form a cluster of systems, is proposed. These connected systems can be any computing, control, storage or embedded system. The scalability of the interconnect will allow the cluster to grow the bandwidth between the systems as they become necessary without changing to a different connection architecture.

Figure 1:
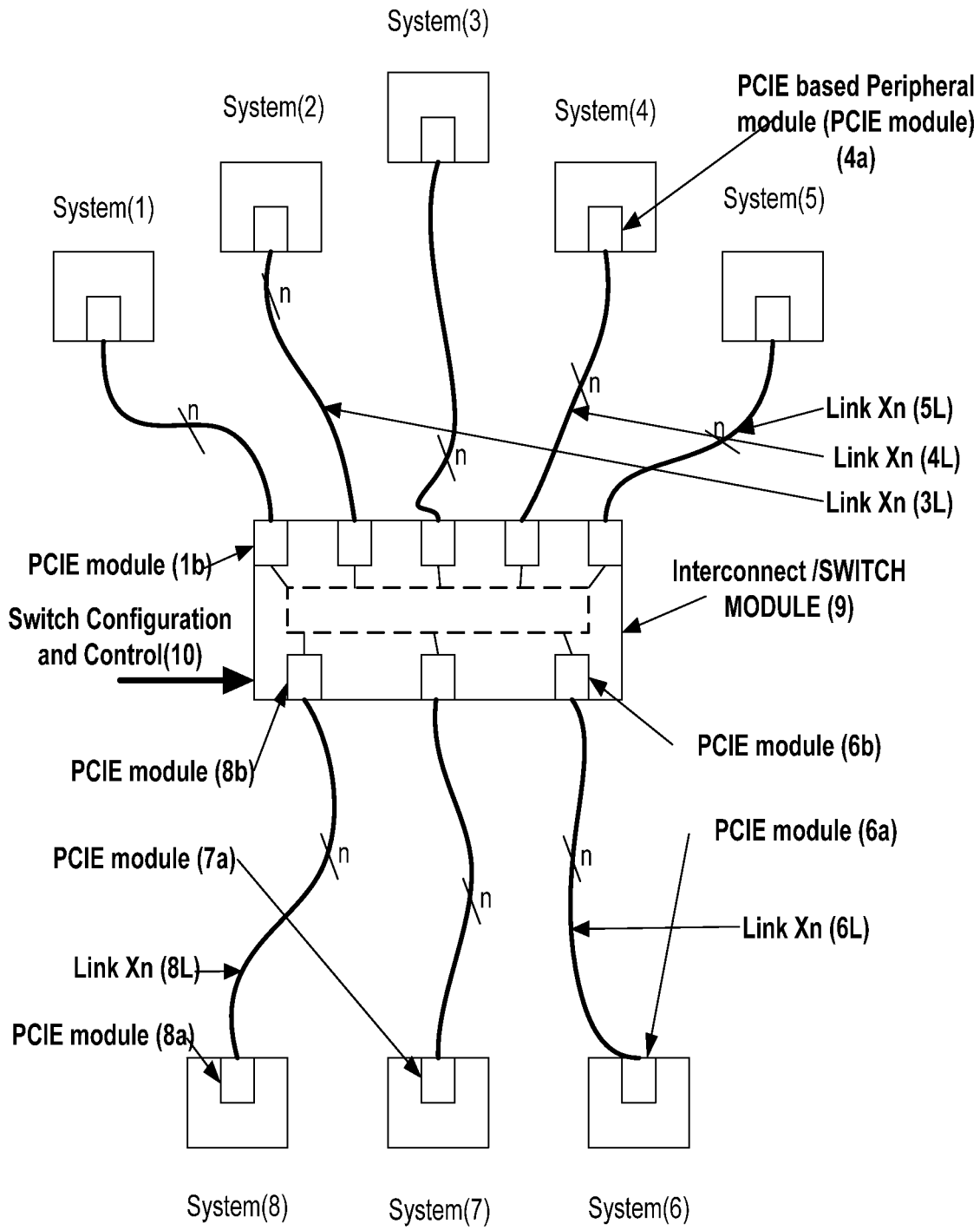
FIG. 1 Typical Interconnected (multi-system) cluster (shown with eight systems connected in a star architecture using direct connected data links between PCIE standard based peripheral to PCIE standard based peripheral)

FIG. 1 is a typical cluster interconnect. The Multi-system cluster shown consist of eight units or systems {(1) to (8)} that are to be interconnected. Each system is PCI Express (PCIE) based system with a PCIE root complex for control of data transfer to and from connected peripheral devices via PCIE peripheral modules as is standard for PCIE based systems. Each system to be interconnected has at least a PCIE based peripheral module {(1a) to (8a)} as an IO module, at the interconnect port enabled for system interconnection, with n-links built into or attached to the system. (9) is an interconnect module or a switch sub-system, which has number of PCIE based connection modules equal to or more than the number of systems to be interconnected, in this case of FIG. 1 this number being eight {(1b) to (8b)}, that can be interconnected for data transfer through the switch. A software based control input is provided to configure and/or control the operation of the switch and enable connections between the switch ports for transfer of data. Link connections {(1L) to (8L)} attach the PCIE based peripheral modules 1a to 8a, enabled for interconnection on the respective systems 1 to 8, to the on the switch with n links. The value of n can vary depending on the connect band width required by the system.

When data has to be transferred between say system 1 and system 5, in the simple case, the control is used to establish an internal link between PCIE based peripheral modules 1b and 5b at the respective ports of the switch. A hand shake is established between outbound communication enabled PCIE based peripheral module (PCIE Module) 1a and inbound PCIE module 1b at the switch port and outbound PCIE module 5a on the switch port and inbound communication enabled PCIE module 5b. This provides a through connection between the PCIE modules 1a to 5b through the switch allowing data transfer. Data can then be transferred at speed between the modules and hence between systems. In more complex cases data can also be transferred and qued in storage implemented in the switch, at the ports and then when links are free transferred out to the right systems at speed.

Multiple systems can be interconnected at one time to form a multi-system that allow data and information transfer and sharing through the switch. It is also possible to connect smaller clusters together to take advantage of the growth in system volume by using an available connection scheme that interconnects the switches that form a node of the cluster.

If need for higher bandwidth and low latency data transfers between systems increase, the connections can grow by increasing the number of links connecting the PCIE modules between the systems in the cluster and the switch without completely changing the architecture of the interconnect. This scalability is of great importance in retaining flexibility for growth and scaling of the cluster.

It should be understood that the system may consist of peripheral devices, storage devices and processors and any other communication devices. The interconnect is agnostic to the type of device as long as they have a PCIE module at the port to enable the connection to the switch. This feature will reduce the cost of expanding the system by changing the switch interconnect density alone for growth of the multi-system.

PCIE is currently being standardized and that will enable the use of the existing PCIE modules to be used from different vendors to reduce the over all cost of the system. In addition using a standardized module in the system as well as the switch will allow the cost of software development to be reduced and in the long run use available software to configure and run the systems.

As the expansion of the cluster in terms of number of systems, connected, bandwidth usage and control will all be cost effective, it is expected the over all system cost can be reduced and over all performance improved by standardized PCIE module use with standardized software control.

Typical connect operation may be explained with reference to two of the systems, example system (1) and system (5). System (1) has a PCIE module (1a) at the interconnect port and that is connected by the connection link or data-link or link (1L) to a PCIE module (1b) at the 10 port of the switch (9). System (5) is similarly connected to the switch trough the PCIE module (5a) at its interconnect port to the PCIE module (5b) at the switch (9) IO port by link (5L). Each PCIE module operates for transfer of data to and from it by standard PCI Express protocols, provided by the configuration software loaded into the PCIE modules and switch. The switch operates by the software control and configuration loaded in through the software configuration input.

Figure 2:
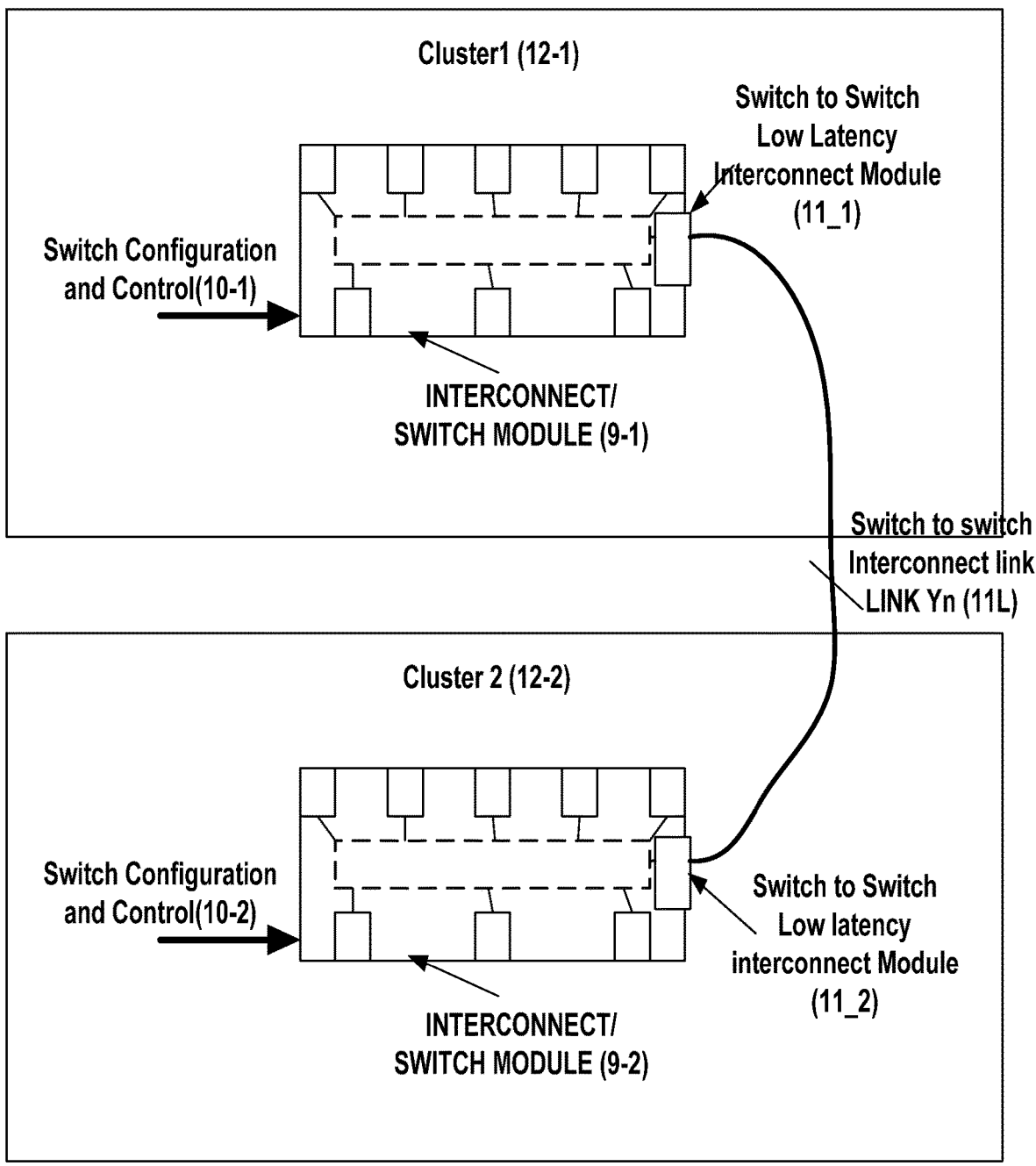
FIG. 2 A cluster using multiple interconnect modules or switches to interconnect smaller clusters.

FIG. 2 is that of a multi-switch cluster. As the need tom interconnect larger number of systems increase, it will be optimum to interconnect multiple switches of the clusters to form a new larger cluster. Such a connection is shown in FIG. 2. The shown connection is for two smaller clusters (12-1 and 12-2) interconnected using PCIE modules that can be connected together using any low latency switch to switch connection (11-10 and 11-2), connected using interconnect links (11L) to provide sufficient band width for the connection. The switch to switch connection transmits and receives data and information using any suitable protocol and the switches provide the interconnection internally through the software configuration loaded into them.

The following are some of the advantages of the disclosed interconnect scheme 1. Provide a low latency interconnect for the cluster. 2. Use of PCI Express based protocols for data and information transfer within the cluster. 3. Ease of growth in bandwidth as the system requirements increase by increasing the number of links within the cluster. 4. Standardized PCIE component use in the cluster reduce initial cost. 5. Lower cost of growth due to standardization of hardware and software. 6. Path of expansion from a small cluster to larger clusters as need grows. 7. Future proofed system architecture. 8. Any speed increase in the link connection due to technology advance is directly applicable to the interconnection scheme.

In fact the disclosed interconnect scheme provides advantages for low latency multi-system cluster growth that are not available from any other source.

While the invention has been described in terms of several embodiments, those of ordinary skill in the art will recognize that the invention is not limited to the embodiments described, but can be practiced with modification and alteration within the spirit and scope of the appended claims. Multiple existing methods and methods developed using newly developed technology may be used to establish the hand shake between systems and to improve data transfer and latency. The description is thus to be regarded as illustrative instead of limiting and capable of using any new technology developments in the field of communication an data transfer. There are numerous other variations to different aspects of the invention described above, which in the interest of conciseness have not been provided in detail. Accordingly, other embodiments are limited only within the scope of the claims.

The invention claimed is:

1. A PCI-Express based network switch for interconnecting a plurality of PCI-Express computing systems, in a cluster, wherein each of the plurality of PCI-Express based computing systems connects to the PCI-Express based network switch by way of a PCI-Express outbound port on the PCI-Express computing system, and wherein said PCI-Express based network switch provides data transfer back and forth between said PCI-Express computing systems using PCI-Express protocol, the PCI-Express based network switch comprising:

at least a first PCI-Express inbound port on the PCI-Express based network switch, wherein said first inbound PCI-Express port is connected to a first PCI-Express outbound port of a first of the interconnected PCI-Express computing systems, wherein the first of the interconnected PCI-Express computing systems comprises a first PCI-Express root complex, and the first PCI-Express outbound port of the first of the interconnected PCI-Express computing systems is connected to the first PCI-Express root complex;

at least a second PCI-Express inbound port on the PCI-Express based network switch, wherein said second PCI-Express inbound port is connected to a second PCI-Express outbound port of a second of the interconnected PCI-Express computing systems, wherein the second of the interconnected PCI-Express computing systems comprises a second PCI-Express root complex, and the second PCI-Express outbound port of the second of the interconnected PCI-Express computing systems is connected to the second PCI-Express root complex;

wherein data is transferred to and from the first of the interconnected PCI-Express computing systems and the first PCI-Express inbound port using PCI-Express protocol;

wherein data is transferred to and from the second of said interconnected PCI-Express computing systems and the second PCI-Express inbound port using PCI-Express protocol; and wherein data is transferred between said first PCI-Express inbound port on the PCI-Express based network switch and the second PCI-Express inbound port on the PCI-Express based network switch, such that data transfer and communication is performed between the first and second of the interconnected PCI-Express computing systems in the PCI-Express cluster using PCI-Express protocol;

wherein each of the plurality of PCI-Express computing systems that connects to the PCI-Express based network switch connects by way of the PCI-Express outbound port at a PCI based peripheral module forming an end point of the PCI Express Bus configured as an I/O module enabled for system inter-connection;

wherein the PCI-Express endpoints of each of the plurality of PCI-Express computing systems that connects to the PCI-Express based network switch are part of the PCI-Express Bus that is the I/O interconnect of the respective PCI-Express computing systems;

wherein the PCI-Express based network switch is configured for data transfer back and forth between the PCI-Express computing systems, connected to the PCI-Express based network switch using PCI-Express protocol; and wherein the data transfer within the PCI-Express bus of each connected PCI-Express computing system is using PCI-Express protocols.

2. The network switch of claim 1 wherein said PCI-Express based network switch also includes a PCI-Express inbound port for connecting to a PCI-Express inbound port on a second PCI-Express based network switch using PCI-Express protocol, for transferring data to and from the first or second of said interconnected PCI-Express computing systems and a third PCI-Express computing system connected to the second PCI-Express based network switch using PCI-Express protocol.

3. The network switch of claim 1 wherein the network switch comprises one or more semiconductor switch devices.

4. The plurality of computing systems of claim 1, are systems selected from a group comprising computing systems, control systems, storage systems and embedded systems.

5. A system comprising:

a plurality of PCI-Express computing systems inter-connected in a cluster through a PCI-Express based network switch and using PCI-Express protocol for transferring data back and forth among the plurality of PCI-Express computing systems;

wherein each of the plurality of PCI-Express computing systems interconnected in the cluster is enabled with a PCI Express Bus that is an input/output (I/O) interconnect for data transfer to and from connected PCI-Express peripheral devices via PCI-Express peripheral modules forming end points of the PCI Express Bus; and wherein said PCI-Express based network switch comprises:

a) at least a first PCI-Express inbound port on said PCI-Express based network switch, wherein said first PCI-Express inbound port is connected to a first PCI-Express outbound port of a first PCI-Express computing system of the plurality of PCI-Express computing systems, wherein the first PCI-Express computing system comprises a first PCI-Express root complex, and the first PCI-Express outbound port of the first PCI-Express computing system is connected to the first PCI-Express root complex; and b) at least a second PCI-Express inbound port on said PCI-Express based network switch, wherein said second PCI-Express inbound port is connected to a second PCI-Express outbound port, that is a PCI-Express end point, the PCI-Express bus configured as an out bound port, of a second PCI-Express computing system of the plurality of PCI-Express computing systems, wherein the second PCI-Express computing system comprises a second PCI-Express root complex, and the second PCI-Express outbound port of the second PCI-Express computing system is connected to the second PCI-Express root complex;

wherein each of the PCI-Express computing systems that connects to the PCI-Express network switch connects by way of a PCI-Express outbound port at a PCI based peripheral module configured as an I/O module on the PCI Express Bus, enabled for system inter-connection;

wherein data is transferred within each interconnected PCI-Express system over the PCI-Express bus;

wherein data is transferred to and from said first PCI-Express computing system via the first PCI-Express outbound port and said first PCI-Express inbound port on said PCI-Express based network switch using PCI-Express protocol;

wherein data is transferred to and from said second PCI-Express computing system via the second PCI-Express outbound port and said second PCI-Express inbound port on said PCI-Express based network switch using PCI-Express protocol; and wherein data is further transferred between said first PCI-Express inbound port on said PCI-Express based network switch and said second PCI-Express inbound port on said PCI-Express network switch, such that data transfer and communication is performed between the first and second PCI-Express computing systems in the PCI-Express cluster using PCI-Express protocol.

6. The system of claim 5, wherein said PCI-Express based network switch also includes a PCI-Express-enabled port for connecting to a PCI-Express-enabled port on a second PCI-Express based network switch using PCI-Express protocol, for transferring data to and from the first or second PCI-Express computing systems and a third PCI-Express computing system connected to the second PCI-Express based network switch using PCI-Express protocol.

7. The system of claim 5 wherein the network switch comprises one or more semiconductor switch devices.

8. The plurality of inter-connected computing systems of claim 5, are systems selected from a group comprising computing systems, control systems, storage systems and embedded systems.

* * * * *